Sept. 1, 1931.   D. J. GREILING   1,821,093
REFRIGERATING CABINET
Filed Nov. 11, 1927   3 Sheets-Sheet 1
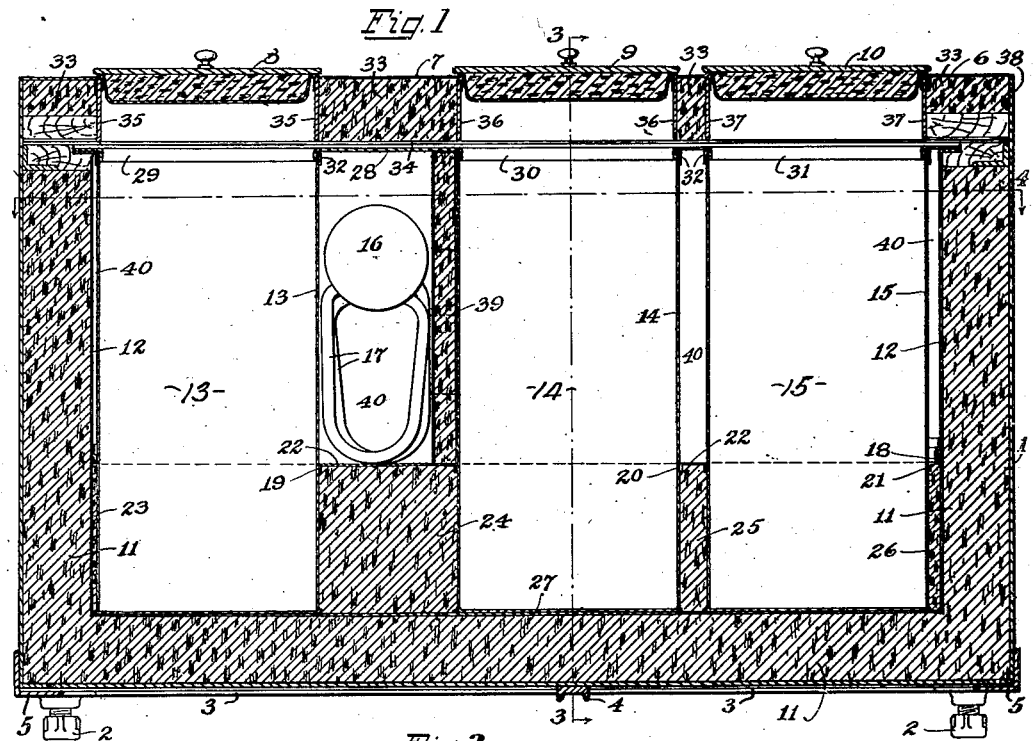
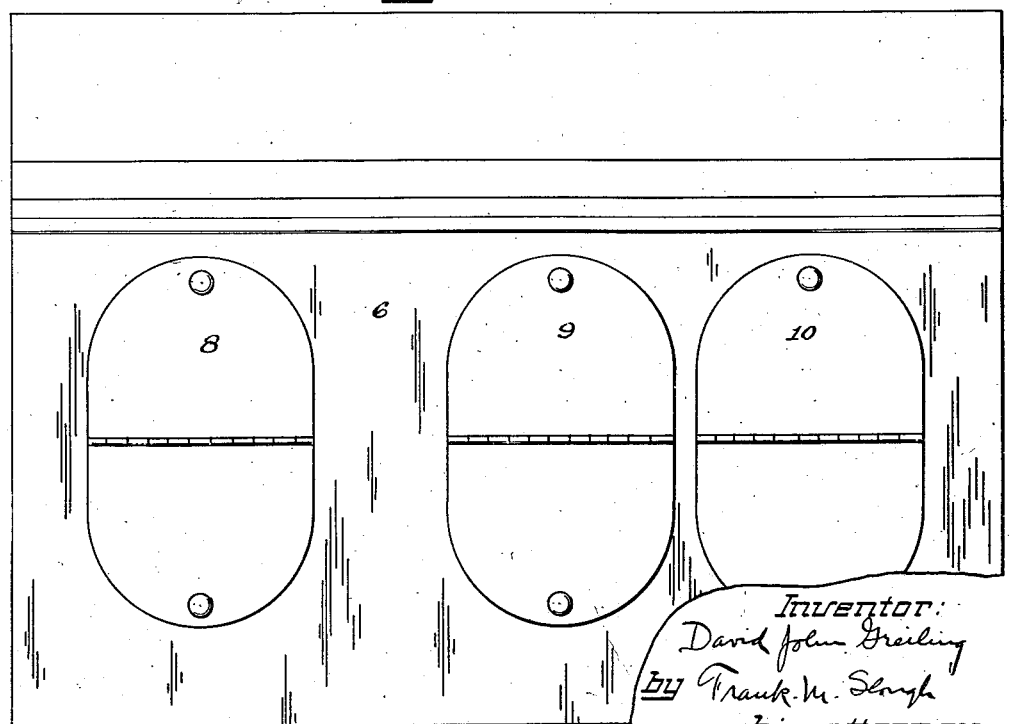

Sept. 1, 1931.   D. J. GREILING   1,821,093
REFRIGERATING CABINET
Filed Nov. 11, 1927   3 Sheets-Sheet 2

Inventor:
David John Greiling
by Frank M. Slough
his attorney.

Patented Sept. 1, 1931

1,821,093

UNITED STATES PATENT OFFICE

DAVID JOHN GREILING, OF CLEVELAND HEIGHTS, OHIO, ASSIGNOR TO THE BISHOP & BABCOCK MANUFACTURING CO., OF CLEVELAND, OHIO, A CORPORATION OF OHIO

REFRIGERATING CABINET

Application filed November 11, 1927. Serial No. 232,558.

My invention relates to improvements in refrigerating cabinets and relates particularly to the type applicable to the storing for dispensing purposes of cans of ice cream and similar articles.

An object of my invention is to provide a cabinet adapted to receive a plurality of cans of ice cream or the like and in which provision is made for keeping the ice cream at a low temperature without brine or other cooling liquid coming in contact with the can.

Another object of my invention is to provide against an undue degree of refrigerating effect being communicated to the ice cream or the like in the bottom portions of the cans.

Another object of my invention is to provide a refrigerating cabinet adapted to receive ice cream cans, crushed fruit jars, and the like, together with a refrigerating mechanism incorporated in the cabinet in a highly efficient manner.

Another object of my invention is to provide a refrigerating cabinet wherein the aforesaid objects may be efficiently accomplished and which may be produced in quantities in a relatively inexpensive manner.

Other objects of my invention and the invention itself will become apparent from the following description of an embodiment of my invention and in which description reference will be had to the accompanying drawings forming a part of this specification.

Referring to the drawings:

Fig. 1 is a view in longitudinal medial vertical section of a refrigerating cabinet for a soda fountain, embodying the principles of my invention;

Fig. 2 is a plan view of the embodiment of Fig. 1;

Figure 3:
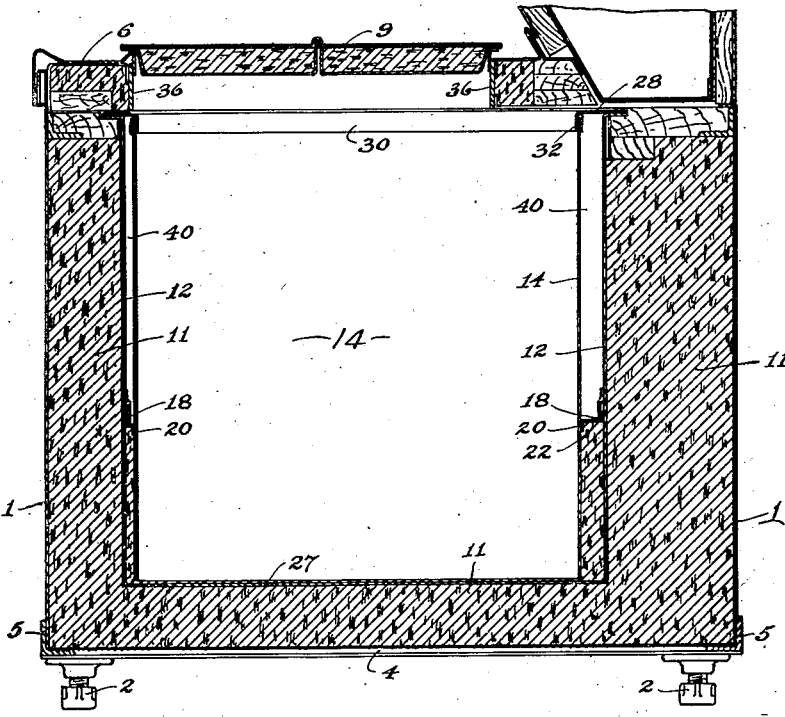
Fig. 3 is a section taken on the line 3—3 of Fig. 1.

Referring now to the different figures of the drawing in all of which like parts are designated by like reference characters, at 1, I show an outer casing for the cabinet preferably of sheet iron or steel enameled with porcelain, glass or the like to prevent corrosion and supported on adjustable legs 2 by a channel iron superframe comprising longitudinally extending channel iron strips 3 and transverse channel iron strips 4. Around the lower edge of the casing 1, I provide an enclosing frame of channel iron of L-shaped section, shown at 5. The casing may preferably be, as illustrated, of rectangular form and may terminate in a suitably formed rim 6. The casing 1 is lined with a relatively thick layer of cork or the like 11, extending along its side and bottom walls providing a space within the cork lining of substantially rectangular form. The cork lining may have its inner surfaces faced, as illustrated, with a layer of insulating fibre secured to it by an adhesive. Within the cork lining, there is disposed an interior tank 12 which is preferably made of sheet copper or other metallic material which is not subject to corrosion when exposed to brine or like liquids employed as a refrigerant medium.

The copper tank is packed tightly in place by the cork lining, a portion of which comprising the side wall lining portions may be inserted in place after the tank has been placed in position within the casing 1. Within the rectangular tank 12 I then place a plurality of containers 13, 14, and 15, which are generally oval in form, preferably with straight sides, in spaced relation, as illustrated, 3 being herein shown, each having open ended tops and closed bottoms.

Between the container 13 and the container 14, I provide sufficient space to accommodate a refrigerating boiler 16 and coils 17, whch may be of the ordinary well known Nizer or Frigidaire types, commonly known in the art.

Figures 5, 6:
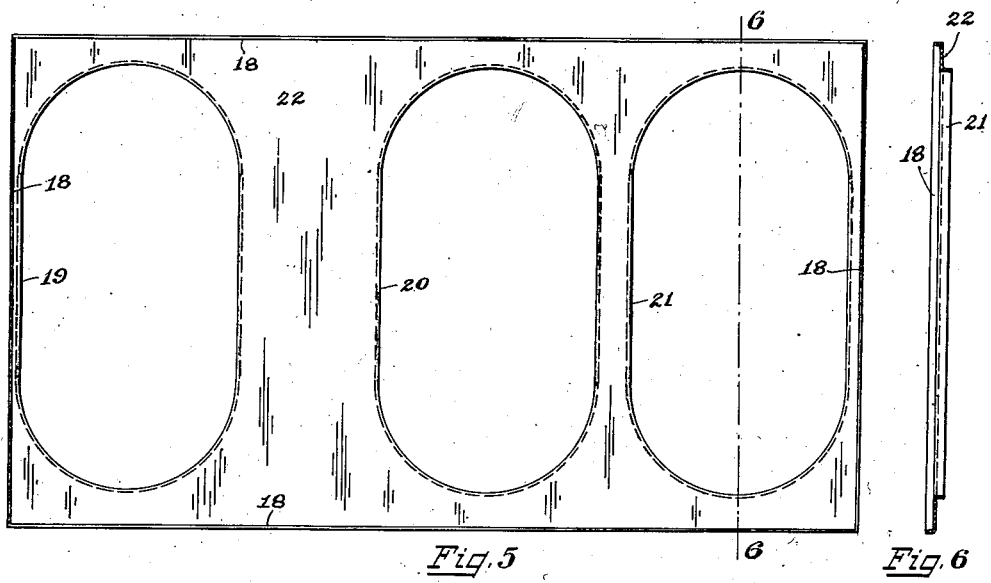
Fig. 5 is a plan view of a division plate extending transversely of the cabinet in its lower portion and forming a bottom wall for the brine compartment.
Fig. 6 is a sectional view of the plate of Fig. 5 taken on the line 6—6.

Bridging the exterior surfaces of the containers 13, 14 and 15 and the adjacent surfaces of the interior of the tank 12, a perforated division plate 22, shown in Figs. 5 and 6, is disposed. This division plate having upturned edges 18 in engagement all around with the inner walls of the tank 12, the plate being perforated with downturned flanges 19, 20 and 21, respectively, adapted to receive at the perforations receiving respectively the containers 13, 14 and 15.

Prior to the positioning of the plate 22, the spaces below the plate 22 as positioned, indicated at 23, 24 and 25 and 26, are filled with ground cork which is held down in compressed condition by the plate 22 against the bottom wall 27 of the outermost casing 1. The divisional plate 22 is then given a sufficient coat of pitch or other sealing compound which is flowed to the junctions between the upturned border flange 18 and the inner walls of the tank 12 contacted thereby and the downturned oval shaped flanges 19, 20 and 21, and the outer walls of the containers 13, 14 and 15, respectively, with which the downturned flanges contact and the sealing compound effectually seals the joints between the plate and the contacted walls of the container 12 and receptacles 13, 14 and 15 so that a fluid tight seal is had at the level of the plate dividing the tank into upper and lower fluid tight compartments. The lower compartment of which contains besides the bottom ends of the receptacles 13, 14 and 15, a surrounding packing of ground cork or other suitable heat insulating substance. The tank 12, as a whole, is also substantially completely surrounded by a relatively thick layer of cork disposed between it and the outer casing 1 of the cabinet.

Figure 7:
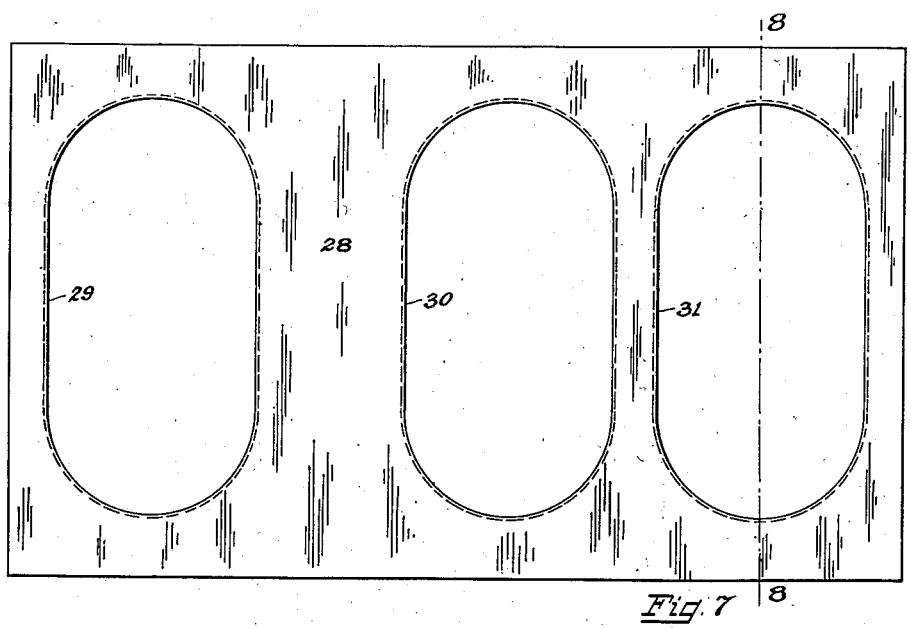
Fig. 7 is a plan view of a perforated top plate employed in the said embodiment.
Figure 8:
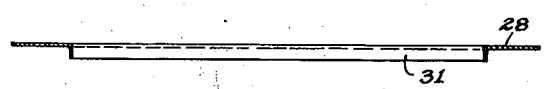
Fig. 8 is a sectional view taken on the line 8—8 of Fig. 7.

A top plate 28, as shown specifically in Figs. 7 and 8, is pressed downwardly onto the tops of the receptacles 13, 14 and 15 with downturned flanges 29, 30 and 31 thereof which define the perforations through the plate extending within the rim of the receptacles 13, 14 and 15. The rims are downturned outwardly as shown at 32 for the receptacle 13, so as to strengthen the receptacles in their rim portions. The downturned flanges of the top plate 28 are so formed as to make tight engagement within the receptacle rims. A superstructure is then placed over the top of the cabinet in the usual way comprising cork packing 33 enclosed by metallic walls 7, 34, 35, 36, 37 and 38 and which contain openings for the reception of the hinged covers 8, 9 and 10 to permit the receptacles 13, 14 and 15 disposed below the openings through the superstructure thus covered.

The construction of the upper part of the cabinet is not a part of my present invention and wide departures may be made from the construction thereof as illustrated and described.

On one or both sides of the refrigerating boiler and tubes 16 and 17, I may place a cork or other heat insulating partition shown at 39 and which may be faced with galvanized iron, copper or other material, not subject to corrosion by brine. Brine is placed in the brine compartment 40 which comprises the spaces all around all of the receptacles 13, 14 and 15 down to the level of the plate 22. The plate 22, however, forms a partition or division impervious to the flow of brine to the spaces below the plate which is filled with heat insulating material, such as ground cork as previously described.

Figure 4:
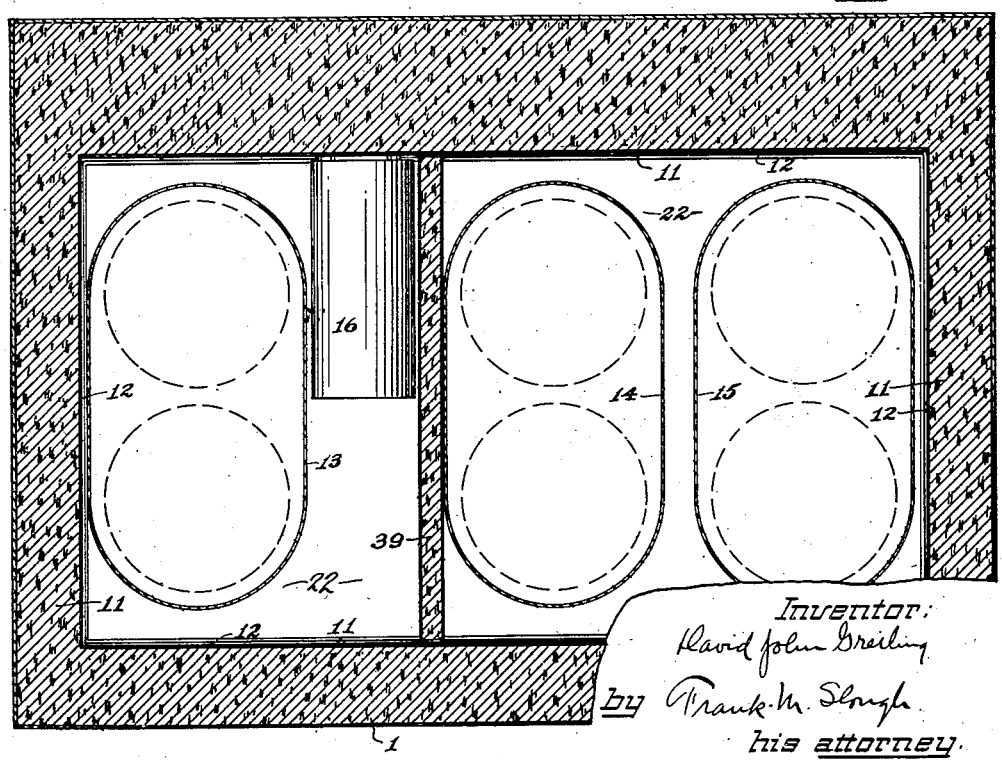
Fig. 4 is a transverse section taken on the line 4—4 of Fig. 1.

Each of the receptacles 13, 14 and 15 may be cylindrical and adapted to contain but a single can of ice cream or in the embodiment herein illustrated and described, these receptacles are made having approximately semi-cylindrical end walls and straight side walls, whereby, as indicated by dotted lines in Fig. 4, a pair of ice cream cans may be placed in each of the receptacles.

By not permitting the brine to come into contact with the receptacles below the level of the divisional plate 22, I reduce the refrigerating effect which would otherwise be had on the bottom of the cans which is found to be conducive to more evenly refrigerate the contents throughout the can. It is found that on account of the dispensing of ice cream or the like from the upper portions of the can from time to time, refrigerating effect had upon the upper portion of the contents is reduced, so that by reducing the refrigerating effect communicated to the bottoms of the cans, a compensating effect is had on the contents of the bottom portions of the can which would otherwise be frozen too hard for readily dispensing when the contents become so exhausted as to permit dispensing of these lowermost ice cream portions.

In the cabinet of my invention, I accomplish this desirable result in a construction which is relatively simple, is adaptable for any number of ice cream can receptacles and which moreover is uniformly efficient in its refrigerating effect on the different cans placed within the different receptacles provided in the cabinet.

Having thus described my invention I am aware that numerous and extensive departures may be made from the embodiment herein illustrated and described but without departing from the spirit of my invention.

I claim:

In a refrigerating cabinet for refrigerating the contents of ice cream cans or the like, an outer and an inner tank portion, the inner being adapted to be telescopically nested in the outer and adapted to be removed therefrom as a unit for inspection purposes, the outer tank portion comprising an outer and inner bottom wall in spaced relation and a plurality of outer and inner side walls in spaced relation, the space between the walls and between the bottoms being filled with heat insulating material; and the inner tank portion comprising a bottom wall and a plurality of side walls, a plurality of receptacles each adapted to receive a can, the receptacles being disposed within the inner tank portion in spaced relation to each other and to the side walls of the tank, a horizontal partition surrounding the receptacles and dividing that portion of the space within the inner tank portion and outside of the receptacles into upper and lower fluid tight compartments, the upper compartment being adapted to contain a fluid refrigerant and the lower compartment being adapted to be filled with heat insulating material.

In testimony whereof I hereunto affix my signature this 15 day of October, 1927.

DAVID JOHN GREILING.